(No Model.)
I. W. LITCHFIELD & T. W. SANFORD.
BICYCLE BRAKE.
No. 531,050. Patented Dec. 18, 1894.
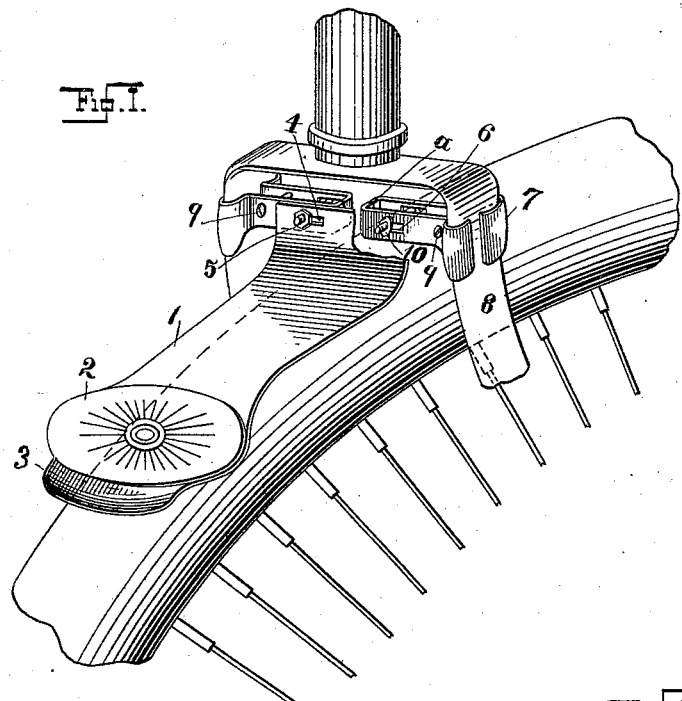
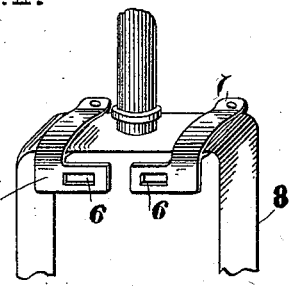
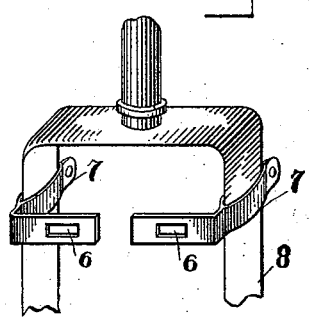
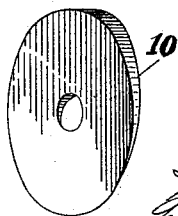
Witnesses:
Inventors:
Isaac W. Litchfield
Townsend W. Sanford

UNITED STATES PATENT OFFICE.

ISAAC W. LITCHFIELD AND TOWNSEND W. SANFORD, OF WARWICK, NEW YORK.

BICYCLE-BRAKE.

SPECIFICATION forming part of Letters Patent No. 531,050, dated December 18, 1894.

Application filed March 26, 1894. Serial No. 505,221. (No model.)

*To all whom it may concern:*

Be it known that we, ISAAC W. LITCHFIELD and TOWNSEND W. SANFORD, citizens of the United States, residing at Warwick, county of Orange, State of New York, have invented certain new and useful Improvements in Bicycle-Brakes, of which the following is a specification.

On the 29th of June, 1893, we filed our application, serially numbered 479,137, for an improvement in brakes for bicycles adapted to be operated by the foot of the wheelman. The object in wheels of this kind is to produce a brake which is as light as possible and lacks the clumsy, expensive and weighty connecting devices which are required in connection with any brake designed to be operated by the hand. In our aforesaid application we described a brake spring or shoe connected to a bicycle fork by means of a clip consisting of two plates and suitable bolts.

The present application is to cover certain improvements we have made in the construction of the clip and in the method of supporting the brake thereby.

In the accompanying drawings, Figure I is a perspective view (part of the brake spring being broken away for clearness of illustration) representing our improved brake applied to the fork of a bicycle. Figs. II and III are detail views illustrating certain modifications in the shape of a clip. Fig. IV is a perspective view of the adjusting washer.

1 is the brake spring or shoe. This is preferably of thin sheet metal, appropriately curved, having a roughened or rubber covered portion 2 whereon the wheelman's foot may bear and having its free end 3 so curved as to prevent the possibility of its digging into the tire. The other end of the brake spring 1 is turned up and slotted transversely as shown at 4 to receive the bolts 5, which engage in slots 6 in two spring clips 7 shaped as shown so that their outer ends can grasp the bars of the fork 8 with a tension derived from and regulated by bolts and nuts 9. The clips 7 are preferably of spring metal and they may be hinged at "*a*" or other suitable point. Between said clips and the brake spring 1, I place washers 10 having a round or squared or partly squared hole and of wedge shape in transverse section as shown in Fig. IV. By turning these washers the free end 3 of the spring 1 can be adjusted as desired with relation to the bicycle tire.

The construction as above described is such that the brake can be applied to any form of bicycle without regard to the length of the fork or the height of its cross piece above the wheel and we derive a spring action from the structure of the clip itself as well as from the spring material of the brake proper 1. The slots 4 and 6 provide for adjustment of the lips to forks of varying widths.

Slight modifications are shown in Figs. II and III wherein the arms of the clips to which the brake proper 1 is connected, are modified from the U-shape shown in Fig. I. In Fig. II our modified form of clip is shown applied to the cross bar of the fork while in Fig. III by a slight change of its shape it is shown adapted for application to the vertical parts thereof.

Having thus described our invention, what we claim as new therein, and desire to secure by Letters Patent, is—

1. In combination with the brake proper 1 of spring sheet metal, having at one end a portion adapted to receive the foot and at the other end a turned up portion the independent clips 7, 7 which are adapted to engage the bicycle fork and having arms projecting toward each other means of attachment of the brake proper 1 thereon, substantially as and for the purposes set forth.

2. The combination of the brake spring 1 slotted as shown at 4, the clips 7, 7 having slots 6 and bolts and nuts 5, 9, all adapted to operate substantially as set forth.

3. The combination of the brake spring 1, the clips 7, 7, the bolts 5 and the wedge-shaped washers 10, arranged and adapted to operate substantially as set forth.

ISAAC W. LITCHFIELD.
TOWNSEND W. SANFORD.

Witnesses:
S. S. VAN SAUN,
J. B. WOOD.